S. W. CRANE.
ACCOUNT REGISTER.
APPLICATION FILED JUNE 6, 1911.
1,031,325.
Patented July 2, 1912.
2 SHEETS—SHEET 1.
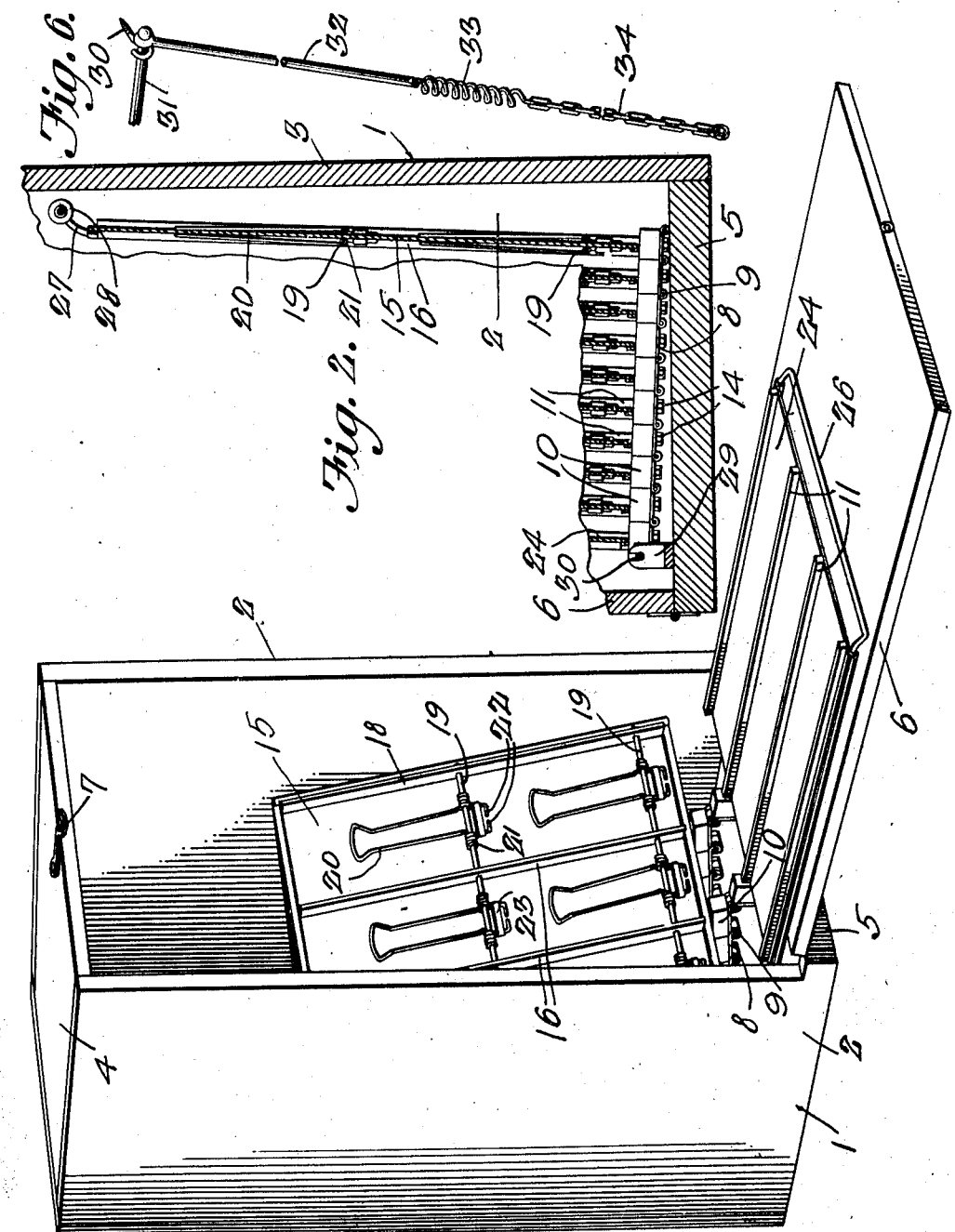
Witnesses
S. W. Crane Inventor
by C. A. Snow & Co.
Attorneys S. W. CRANE.
ACCOUNT REGISTER.
APPLICATION FILED JUNE 6, 1911.
1,031,325.
Patented July 2, 1912.
2 SHEETS—SHEET 2.
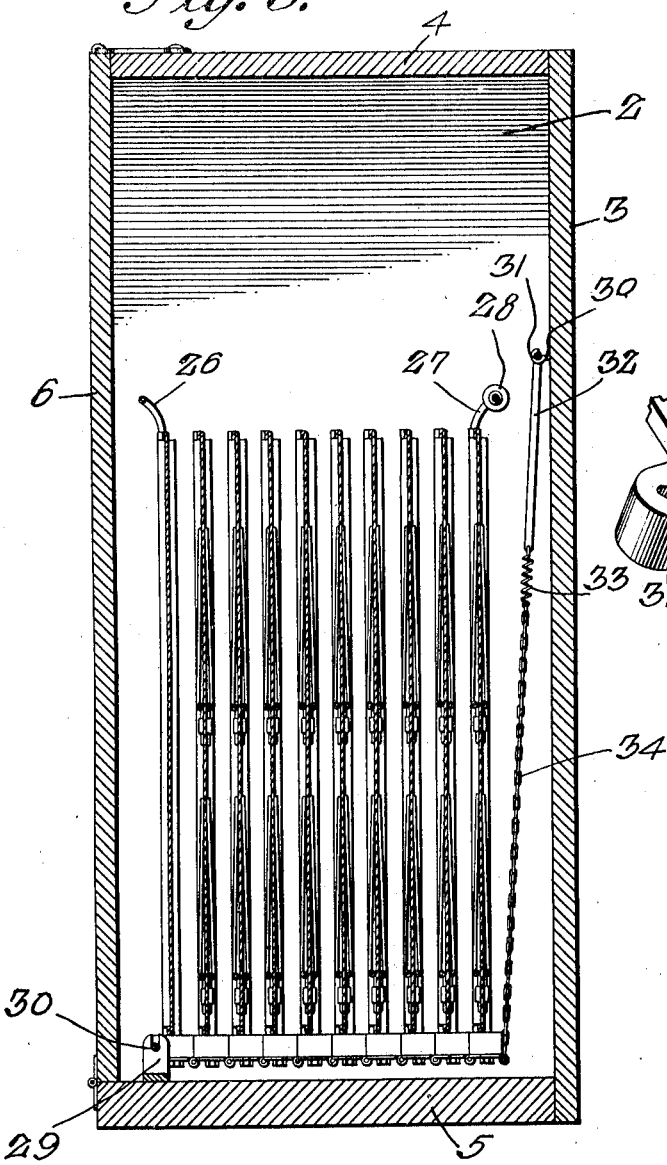
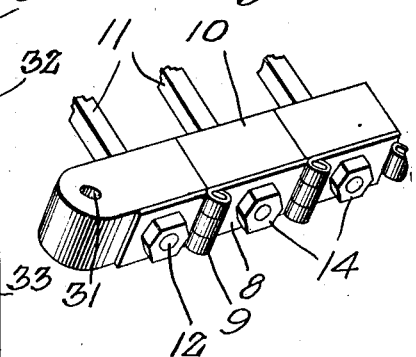
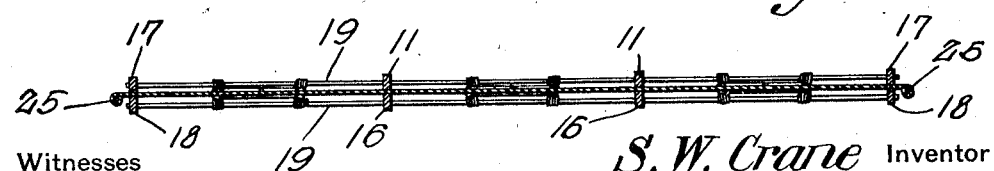
S. W. Crane Inventor

UNITED STATES PATENT OFFICE.

SAMUEL W. CRANE, OF LA FAYETTE, INDIANA.

ACCOUNT-REGISTER.

1,031,325.　　　　　　Specification of Letters Patent.　　Patented July 2, 1912.

Application filed June 6, 1911. Serial No. 631,645.

*To all whom it may concern:*

Be it known that I, SAMUEL W. CRANE, a citizen of the United States, residing at La Fayette, in the county of Tippecanoe and State of Indiana, have invented a new and useful Account-Register, of which the following is a specification.

The device forming the subject matter of this application, is an account register, adapted to hold sale slips, whereby, by carrying the balance forward, from slip to slip, the account is always ready for settlement, it thereby being possible to dispense with the day book, with the journal, and with the ledger, although the device is by no means to be confined to the use above pointed out.

One object of the present invention is to provide an account register which is compact in construction, and so constructed that it will contain many separate accounts, the construction of the device being such that each separate account may be readily reached and examined.

A further object of the invention is to provide a device of this character, employing a series of leaves, each of which is adapted to contain a number of accounts, the leaves, in series, being readily removable from the case in which they are inclosed.

A further object of the invention is to provide a novel form of supporting structure, upon which the leaves are carried, the supporting structure being flexible, to permit the leaves to be swung outwardly, the supporting structure, however, being capable of being disposed in rigid form, to maintain the leaves in proper relation within the case.

A further object of the invention is to provide novel means for assembling the leaves with the hinged members.

With the above and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a fragmental vertical section of the structure shown in Fig. 1; Fig. 3 is a perspective showing the manner of assembling the leaves with the hinges, the view also showing the general construction of the hinges; Fig. 4 is a transverse section of one of the leaves; Fig. 5 is a vertical section showing a slightly modified form of the invention; and Fig. 6 is a perspective showing one form of means whereby the bank of leaves may be yieldingly supported within the case.

In carrying out the invention there is provided as a primary and fundamental element, a case denoted generally by the numeral 1. This case 1 may be of any desired size, so as to contain any desired number of banks of leaves. However, for convenience in illustration, the case 1 has been shown as of a sufficient size to contain one bank of leaves only. At this point it may be stated that the form of the invention appearing in Fig. 5 may be examined with profit, since the construction of Fig. 5 is identical with the construction of Fig. 1, saving in a slight modification of the suspension means, as will be described hereinafter. The case 1 consists of sides 2, a back 3, a top 4 and a bottom 5. Hingedly connected with the bottom 5, is a vertically swinging closure 6, suitable locking means 7 being provided upon the top 4 of the case, for engagement with the upper edge of the closure.

The invention further includes a bank of leaves, adapted to be removably mounted in the case. The lower edges of the leaves are connected by a series of hinges. These hinges comprise, as shown in Fig. 3, hinge members proper, denoted by the numeral 8, knuckled together, as shown at 9. Upon the hinge members 8 are superposed blocks 10. The blocks 10 are adapted to abut against each other, so that each set of hinge members may constitute a rigid structure. A series of rods 11 are provided, these rods 11 being extended through the blocks 10 and through the hinge members 8, as shown at 12, the ends 12 of the rods 11 being reduced in diameter, and being threaded, to receive nuts 14. The rods 11 thus constitute a means for binding the hinged members proper 8, to the blocks 10. Secured to the rods 11, are plates 15. Alined with the rods 11, but disposed upon the opposite face of the plates 15 from the rods 11, are other rods 16. Other rods 17 and 18 are applied to opposite faces of the plates 15, adjacent the lateral edges thereof. Through the rods 17 and 18 are thrust transverse rods 19, the rods 19 passing also through the rods 11 and 16. Spring clips 20, are coiled, as shown at 21, about the rods 19, the lower ends of the clips, denoted by the numeral 22, bearing against the plates 15, below the rods 19. The construction of these clips, and their operation, will appear from the drawings, without specific illustration. Upon the lower ends 22 of the clips, may be positioned tags 23 indexed in any desired manner.

The outer edges of the foremost leaf, denoted specifically by the numeral 24 in Fig. 1, may be provided, as shown at Fig. 5, along its edges, with an additional rod 25, extended across the upper edge of the leaf 24, to form a bail 26. The rearmost leaf may be equipped with a similar bail 27, upon which is journaled for rotation, a roller 28, adapted to bear against the rear wall 3 of the case 1.

In supporting all of the leaves or plates 15 within the case 1, a bearing bracket 29 is mounted upon the bottom 5, adjacent the front of the case, the bracket 29 being notched in its upper edge, to receive a rod 30 mounted in an opening 31 in the foremost of the hinge blocks 10, as seen in Fig. 3. Noting particularly Fig. 2, it will be seen that when the blocks 10 are all alined, a rigid structure will be provided, the forward end of which is elevated, by means of the bearing bracket 29, at some distance above the bottom 5 of the case, the rear end of this bridging structure resting upon the bottom of the case, adjacent the rear of the case.

The closure member 6 may be swung downwardly into a horizontal position, as shown in Fig. 1, whereupon the leaves or plates 15, one after the other, may be swung forwardly, as shown.

The hinge construction involving the members 8 and 10 is such that the leaves may readily be swung forwardly, one or more at a time. Owing to the fact, however, that the bridging structure involving the blocks 10, slants rearwardly and downwardly, toward the bottom of the case, those leaves 15 which remain within the case, will be tilted rearwardly, so that the roller 28 will bear against the rear wall of the case. Therefore, those leaves or plates 15 which are disposed within the case, cannot fall accidentally forwardly, out of the case. Moreover, the roller 28, riding upon the rear wall 3 of the case, facilitates the operation of tilting each leaf forwardly, it being obvious, that as each leaf is swung forwardly, into the position shown in Fig. 1, those leaves which remain within the case, will be moved upwardly and downwardly, to a slight extent.

Noting Fig. 5, it may be stated that the structure of Fig. 5 is identical with the structure of Fig. 1, saving for the fact that, when desired, a yieldable support for the blocks 10, may be provided at the rear of the case. This yieldable support may be of any desired form. In the form shown in Fig. 5, screw-eyes or the like 30 are inserted into the back 3 of the case, a rod 31 being mounted in the screw-eyes 30. To the rod 31 may be hingedly connected other rods 32, carrying at their lower ends, retractile springs 33, connected with chains 34, which, in their turn, at their lower ends, are connected with the rearmost of the hinge blocks 10.

It will be clearly understood that the roller 28 and the bail 26 may be engaged simultaneously, whereby the entire bank of leaves may be lifted out of the case 1, it being observed that each bank of leaves is removably seated in the bearing 29.

It will be understood that the manner of connecting the transverse rods 19 with the leaves 16, may differ from the specific means hereinbefore described, it being merely essential, primarily, that the leaves 15 be provided with outstanding flanges, through which the rods 19 may be thrust removably. The spring clips 20 may be mounted upon the rods 19, and may be made to coöperate with the leaves or plates 15, without resorting to rivets or other securing elements, adapted to mar the appearance of the structure.

Having thus described the invention, what is claimed is:—

1. As an article of manufacture, a portable filling device, adapted to be removably mounted in a cabinet, and comprising hingedly connected elements; blocks superposed upon said elements and adapted to abut against each other, to maintain the hingedly connected elements in alinement; rods having reduced ends extended through the blocks and through the hingedly connected elements; means upon the ends of the rods, and engaging the hingedly connected elements, to hold said elements engaged with the blocks; leaves carried by the rods; bails connected with the lateral edges of the foremost and rearmost leaves, and standing above said leaves; a roller journaled upon the upstanding portion of one of said bails; and a rod inserted through and protruding beyond the side faces of, the terminal blocks of the series.

2. As an article of manufacture, a portable filing device, adapted to be removably mounted in a cabinet, and comprising hingedly connected elements; blocks superposed upon said elements and adapted to abut against each other, to maintain the hingedly connected elements in alinement; rods having reduced ends extended through the blocks and through the hingedly connected elements; means upon the ends of the rods and engaging the hingedly connected elements, to hold said elements engaged with the blocks; leaves carried by the rods; and bails connected with the lateral edges of the foremost and rearmost leaves, and standing above said leaves.

In testimony that I claim the foregoing as my own, I have hereto affixed my signature in the presence of two witnesses.

SAMUEL W. CRANE.

Witnesses:
 Geo. W. Baxter,
 Harry G. Northrup.